Aug. 24, 1943.   J. M. KIDD   2,327,803
FILTER
Filed Dec. 9, 1940
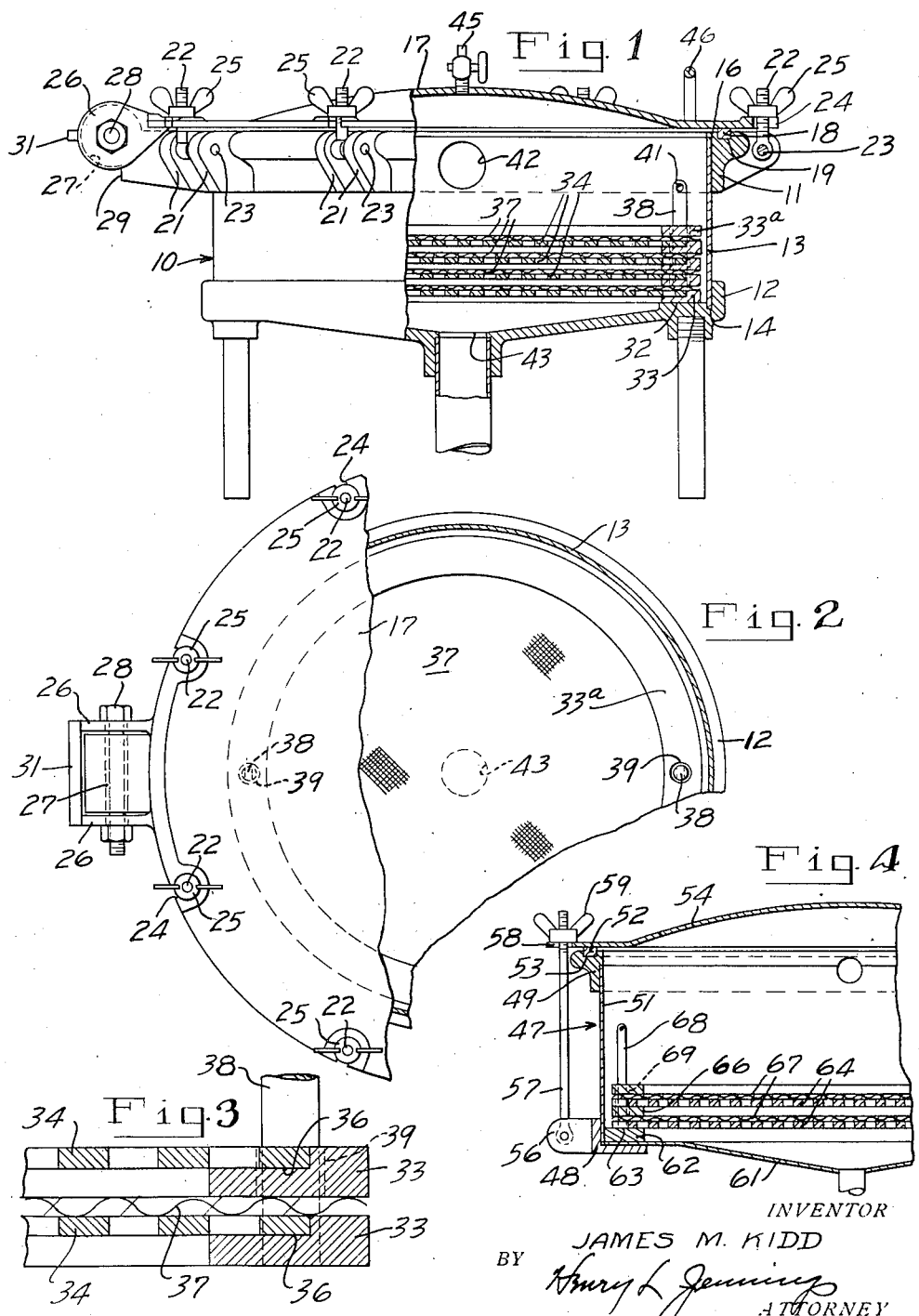
INVENTOR
JAMES M. KIDD
BY
Henry L. Jennings
ATTORNEY Patented Aug. 24, 1943

2,327,803

UNITED STATES PATENT OFFICE 2,327,803

FILTER

James M. Kidd, Birmingham, Ala.

Application December 9, 1940, Serial No. 369,175

2 Claims. (Cl. 210—185)

My invention relates to an improvement in filters, especially those employed in filtering milk products and the like, and has for an object the provision of a filter of the character designated which shall be simple of manufacture and efficient of operation, easily assembled and disassembled, readily cleaned, and free of insanitary corners and surfaces.

Due to the fact that the sanitary laws relating to the handling and treating of milk products are extremely rigid, all equipment used in dairy and creamery work, and especially filters, must be very carefully designed so as to make them capable of being easily cleaned. At the same time, dairy and creamery filters must be practically 100% efficient so as not to permit passage of any foreign matter into the filtered product.

My invention contemplates, therefore, a filter provided with a series of superposed plates bearing filter cloths and capable of being readily disassembled for cleaning, all of the parts being free of any attachment to the filter casing itself.

My invention further contemplates the provision of a filter which embodies a plurality of superposed perforated plates, each of which has a spacer ring associated therewith, on which plate is placed a sheet of filter medium, such as cloth or the like, and in which the cloth is adapted to be held down at its margin by the next superjacent ring.

My invention contemplates the provision of a filter casing which is provided, adjacent its bottom, with a seat for receiving the lowermost of said series of filter plates, in which the seat is smooth and therefore easily cleaned, and which is adapted to be engaged with a leak-proof fit, thus obviating the necessity of providing mechanical means to secure the filter plates to the seat or other part of the filter casing.

My invention further contemplates the provision of a filter as above described which has means secured to the lowermost ring of said series of filter plates by which the whole series of plates may be removed from the filter casing by a simple lifting operation and without the necessity of loosening any screws, nuts, or bolts to release the plates from the casing.

Briefly, my invention comprises a filter casing having a movable cover, an inlet near the top for the liquid to be filtered, and an outlet near the bottom for the filtrate. Near the bottom of the casing I provide a relatively wide, smooth shoulder which is adapted to form a seat for the lowermost of a series of filter plates. In their preferred form each of these filter plates has associated therewith a spacer ring which is adapted on its top side to receive the plate with a flush, smooth fit. On top of each perforated plate I place a sheet of filter material which entirely covers the plate, and which may be either wire or cloth, but preferably the latter.

The lowermost spacer ring is provided with a pair of upstanding pins, each of which has a small hole near its top. The other rings are provided with holes through which the pins pass so that they may be dropped into place, and thus rest on the lowermost ring, and serve in this manner to hold the filter cloths in place, because each of the rings rests on the marginal edge of the cloth next below it. The marginal edges of each of the filter cloths are thus pressed down on the perforated plates with a substantially leak-proof fit so that all of the liquid to be filtered passes through all of the filter cloths. The liquid to be filtered is supplied under pressure through the top opening, and the pressure thus applied and also the hydrostatic head of the liquid within the filter casing serve to press the filter cloths against the rings and the perforated plates, and also serve to press the lowermost ring firmly into leak-proof engagement with the seat provided at the bottom of the filter casing.

Apparatus embodying features of my invention is illustrated in the accompanying drawing forming a part of this application, in which Fig. 1 is a side elevational view, partly in section;

Fig. 2 is a plan view, partly in section;

Fig. 3 is an enlarged fragmental sectional view of two of the superposed filter rings; and Fig. 4 is a fragmental sectional view of a modified form of my invention.

Referring to the drawing for a better understanding of my invention, the device embodies a filter casing 10 which is formed preferably by a top ring 11 and a bottom ring 12 joined together by a relatively thin metal sheet 13, it being understood that all parts coming in contact with the milk are made of stainless steel or other non-corrosive material. It will be noted that the bottom ring 12 is grooved out, as at 14, so that the sheet 13 fits therein to form a snug joint. Likewise, the top ring 11 is provided with a small shoulder, as at 16, approximately the thickness of the sheet 13, so that the interior of the filter presents a smooth, easily cleaned surface. The sheet 13 may be secured to the rings 11 and 12 by means of hard solder, welding, or in any other suitable manner by which a smooth joint is made.

The casing is provided with a movable cover 17 adapted to fit snugly against a gasket 18, which is seated in a groove 19 formed in the ring 11. The ring 11 is provided with a series of pairs of ears 21 for receiving bolts 22, which are adapted to swing about their pivots 23 and engage in notches 24 provided in the top 17. Wing nuts 25 serve to clamp the top 17 rigidly in place on the gasket 18.

The cover 17 is provided at one edge with hinge members 26 adapted to fit over a complemental hinge member 27 carried by the ring 11. A through bolt 28 passes loosely through the members 26 and 27, thus permitting the top to have a limited amount of play so that when the wing nuts 25 on the bolts 22 are run down, the cover will seat itself equally on the whole surface of the gasket 18. The member 27 is provided with a stop 29 adapted, when the cover is raised, to engage a complemental stop 31, thus to provide a rest member for the cover 17 when in open position.

The bottom ring 12 is provided inwardly of the filter casing 10 with a relatively wide, smooth shoulder 32, which shoulder is adapted to receive, with a leak-proof fit, the bottom ring 33 of the series of filter plates 34. Each of these filter plates has secured thereto a ring 33, which latter is grooved out as at 36 (see Fig. 3) to receive its associated plate flush with the top side of the ring 33. A sheet of filter material 37 is detachably carried by each of the plates 34, and is held in place thereon at its marginal edges by the weight of the next superjacent ring 33. These filter cloths 37 are simply laid over the plates 34, and the next ring 33 and plate 34 are placed thereon, and so on until the desired number of plates and filter cloths are in place for the type of liquid being filtered.

Made fast to the bottom ring 33, as by welding or other suitable means, are a pair of diametrically opposed upstanding pins 38, and each of the rings 33 and plates 34 above the lowermost ring 33, has drilled therein holes 39, so that the superjacent rings and plates may be simply dropped over the pins 38 to rest on the lowermost ring 33. The openings 39 are sufficiently large to permit ready assembly and removal of the superjacent rings, and it will be noted that the whole series of rings and plates may be removed from the filter by engaging a suitable tool (not shown) in a small hole 41 provided near the top of the pins 38. It will thus be seen that when the series of filter plates are removed from the filter casing, they may be readily disassembled for cleaning, and the cloths 37 may be removed by simply lifting each succeeding ring and plate from the stack.

In order to hold the uppermost filter cloth 37 in place, I provide a plain ring 33a, which is similar to the rings 33, except that it does not have secured thereto a perforated plate.

An opening 42 is provided near the top of the filter casing 10, through which the liquid to be filtered is forced under pressure. Likewise the lower ring 12 forming the bottom of the casing 10 is provided with an opening 43 for the discharge of the filtered liquid. Air trapped in the casing for any reason may be released by means of a pet cock 45 in the top of the casing.

The operation of my improved filter is as follows. The assembly of filter plates 34 with their associated filter cloths are placed on the shoulder 32, the top 17 is pressed firmly into engagement with the gasket 18 by means of the wing nuts 25, and the liquid to be filtered is forced under pressure through the opening 42, thus filling the interior of the filter casing 10. The pressure and the hydrostatic head of the liquid in the casing 10 serve to hold the filter cloths 37 firmly in engagement with the perforated plates 34, and likewise the pressure and hydrostatic head serve to press the ring 33 of the lowermost filter plate into leak-proof engagement with the smooth shoulder 32. The pressure and hydrostatic head seal each filter cloth against leakage around its marginal edges, and as the cloths become clogged and the internal pressure within the casing increases, the sealing pressure increases also, thus insuring against leakage during the time it would otherwise likely occur. Likewise, as the internal pressure increases the lowermost ring 33 is pressed more firmly against the seat 32 so that no leakage occurs at that point. The margins of the filter cloths between the rings and the plates serve as gaskets to prevent leakage between plates and rings.

All of the liquid to be filtered passes through all of the filter cloths 37, the rings 33 pressing firmly on the marginal edges of the filter cloths with a fluid tight fit, thus making it easier for the liquid to pass through the cloths than between the plates and the several adjacent rings. In actual operation I have found that my improved filter affords a most efficient filtering of the liquid.

When it is desired to remove the filter plates for cleaning, the wing nuts 25 are unscrewed, the cover is raised by means of the handle 46, and pivots about the bolt 28.

A tool is engaged in the holes 41, in the pins 38 and the whole series of filter plates lifted out, it being especially noted that there is no mechanical attachment of any of the filter plates to any part of the casing or the shoulder 32, and that a simple lifting operation is all that is necessary to remove the filter plates from the casing. The rings 33 with their plates 34 may now be lifted off separately and the cloths 37 may be removed for washing or replacement.

In Fig. 4 I show a somewhat modified form of my invention. The filter casing 47 is formed by an angle shaped bottom ring 48 and a plain top ring 49 joined by a plate 51. The top ring 49 carries a gasket 52, countersunk into a groove 53, against which the top 54 is adapted to rest. The bottom ring 48 carries ears 56 to which are pivotally mounted relatively long bolts 57 which pass through slots 58 in the top 54. Wing nuts 59 are provided to press the top firmly on the gasket 52.

The bottom of this modification of my invention is formed by a separate plate 61 which may be spun to the desired shape and secured to the ring 48. An annular ring 62 is soldered or welded to the bottom plate 61 and the side plate 51, and forms a seat 63, similar to 32, for receiving the superposed filter plates 64.

As seen, the superposed plates 64 are spaced apart by rings 66 which are not attached to the plates, and the filter cloths 67 fit under the rings and are pressed down to form a leak-proof joint, as already explained. The lowermost plate 64 rests directly on the seat 63.

Lifting pins 68 are secured to the lowermost plate and the rings and plates above are all provided with holes 69 for receiving the pins so that they may be dropped into place.

The operation of this modification of my invention is substantially the same as hereinbefore described. It will be noted, however, that all parts of the filtering elements are separable and are therefore even more easily cleaned than those shown in Figs. 1 to 3.

In the actual operation of filters built in accordance with my present invention, I have found them to be extremely efficient, durable, and, most important of all, I have found that they are capable of easy cleaning. Because of the fact that the filter plates themselves are not mechanically attached to any part of the filter casing, all parts thereof, including the rings, as well as the cloths themselves, may be easily removed from the filter casing and disassembled and readily cleaned.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a pressure filter, a filter casing having an upper inlet and a bottom outlet for the filtrate, a movable cover for the casing, a series of superposed perforated plates in the casing in spaced relation with the marginal walls thereof, spacer rings between the plates around the outer edges thereof, a sheet of filter cloth over each of the plates, said plates and filter cloth being free of mechanical engagement with each other, the marginal edges of the filter cloths being held in leak-proof engagement on the plates by the weight of the plates and rings above, a seat in the casing for receiving the lowermost of said rings with a leak-proof fit, and lifting pins secured to said lowermost ring and extending upwardly past the superposed rings and plates by means of which the whole series of filter plates may be lifted from the casing.

2. In a pressure filter having an upper inlet and a bottom outlet for the filtrate, a series of independent perforated plates superposed on one another and free of mechanical attachment to one another, a spacer ring interposed between and extending marginally around adjacent plates, a sheet of filter cloth on top of each perforated plate and extending at its margin beneath the next superjacent spacer ring, the filter cloth of each of said filter plates being held in leak-proof engagement on its plate by the weight of the rings and plates above it, lifting pins secured in the lowermost of said rings and passing loosely through the superposed rings and perforated plates, whereby the whole series of filter plates may be lifted from the casing, and a seat adjacent the bottom of the filter casing for receiving the lowermost of said filter plates with a leak-proof fit.

JAMES M. KIDD.